United States Patent [19]

Walsh, IV

[11] Patent Number: 4,541,096
[45] Date of Patent: Sep. 10, 1985

[54] OFF-LINE, RECIRCULATING, WASTE MANAGEMENT SYSTEM FOR CHEMICAL LASERS

[75] Inventor: Raymond F. Walsh, IV, Canoga Park, Calif.

[73] Assignee: Rockwell International Corporation, El Segundo, Calif.

[21] Appl. No.: 581,929

[22] Filed: Feb. 21, 1984

[51] Int. Cl.³ .............................................. H01S 3/22
[52] U.S. Cl. ......................................... 372/59; 372/89
[58] Field of Search ........................ 372/58, 59, 89, 90

[56] References Cited

PUBLICATIONS

Fujioka et al., "Recent Progress in Chemical Lasers", *Oyo Bufuri*, (Japan), vol. 45, No. 10, p. 920, Oct. 1976.

*Primary Examiner*—William L. Sikes
*Assistant Examiner*—Léon Scott, Jr.
*Attorney, Agent, or Firm*—H. Fredrick Hamann; Harry B. Field

[57] ABSTRACT

A waste management system for a DF or HF chemical laser or certain other types of chemical lasers wherein the exhaust gases of the laser are fed into a reaction chamber 12 having a collection sump region 14 at the bottom. A Supply tank 16 is loaded with lithium and is coupled to the chamber 12 by a valved feed line 18. Heating means 44 maintains the lithium in a liquid state. Pressurization means 40 pumps the lithium through the feed line 18 into an injector 32 which delivers the lithium to the chamber 12 where the lithium reacts with the exhaust gases. The reaction forms solid and/or liquid waste products which are collected in the sump region 14. After the laser is shut off, the pressure means 40 coupled to the supply tank 16 is replaced by a vacuum pump 44 which acts through a return line 20 coupling the tank 16 to the sump region 14. The waste products are drawn out of the chamber 12 into the tank 16, the tank lines 18 and 20 are disjoined, and the tank 16 is emptied. The tank lines can then be reconnected and the operation repeated once the tank has been recharged with fresh lithium.

9 Claims, 1 Drawing Figure

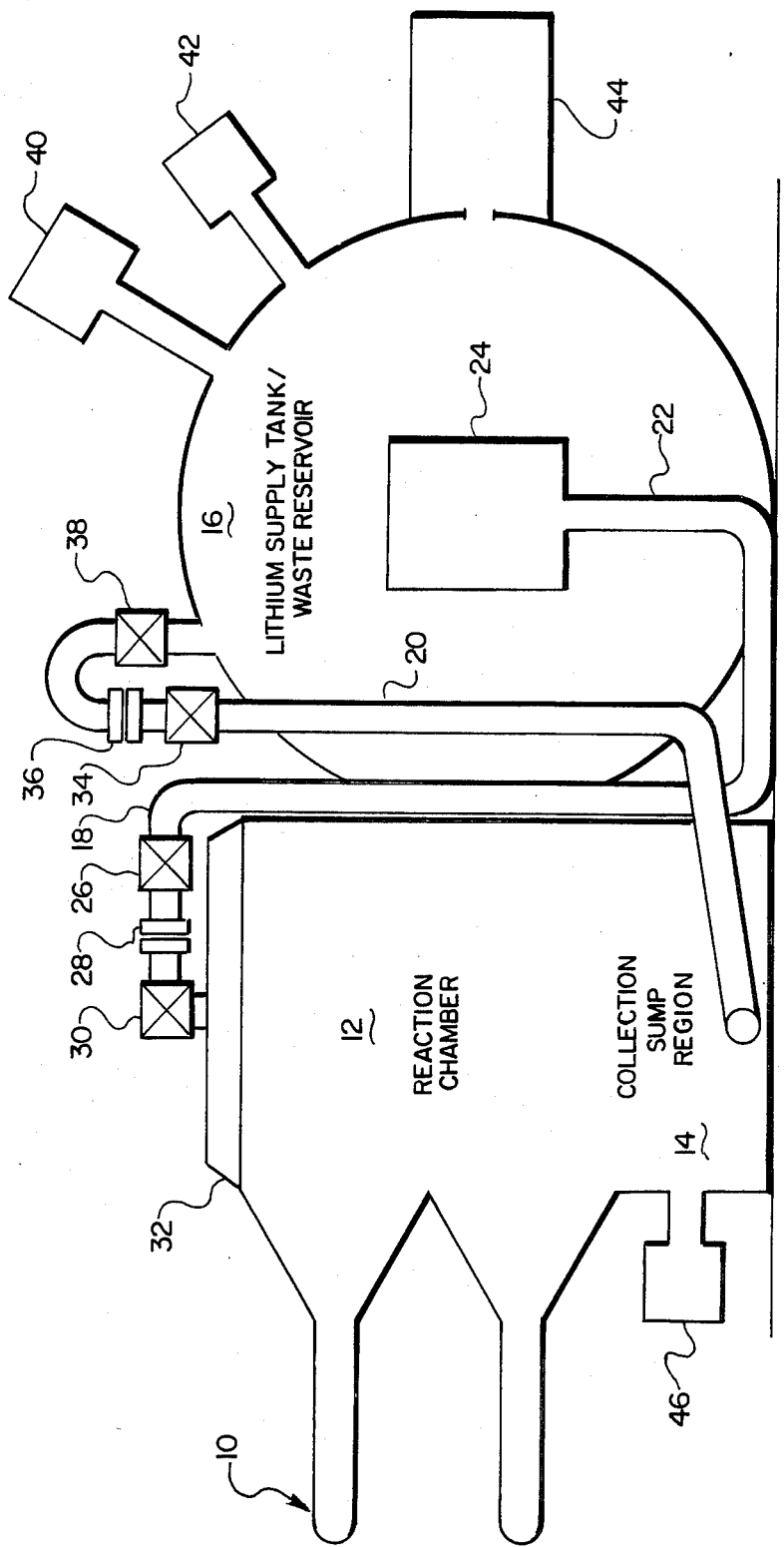

OFF-LINE, RECIRCULATING, WASTE MANAGEMENT SYSTEM FOR CHEMICAL LASERS

BACKGROUND OF THE INVENTION

1. Field of the Invention

This invention relates to a laser-exhaust management system and especially to a laser-exhaust management system for a chemically pumped laser.

2. Description of the Prior Art

Chemically pumped lasers such as HF AND DF types utilize chemical reactions which result in exhaust products such as $N_2$, $H_2$, $NF_3$, HF, $D_2$ and DF gases. One method of handling the gases so that they can be disposed of is to react them with liquid Li to form liquids and solids such as $LiN_3$, LiH, LiD and LiF. Several concepts for accomplishing this have been proposed. However, each concept is subject to problems, For example, the saturated substrate concept requires the employment of very large seals which are expensive and difficult to maintain. The heat-up time is long and the run time is limited due to inability to carry away the generated heat. Another concept employs moving parts which require rotating liquid seals which are difficult to maintain in operation.

OBJECTS OF THE INVENTION

An object of the invention is to provide a management system for the exhaust products of a chemical laser which is simple, can be easily diassembled for charge, discharge and maintenance, provides relatively long run times, permits good thermal control in the reactor exhaust chamber, does not require any moving parts and/or pumping devices within the liquid flow circuit and does not require the breaking of many and/or large hot gas seals for loading and unloading operations.

Other objects, advantages and novel features of the present invention will become apparent from the following detailed description of the invention when considered in conjuction with the accompanying drawing.

SUMMARY OF THE INVENTION

The objects and advantages of the present invention are attained by emptying the exhaust gases of a reacting chemical laser into an exhaust reaction chamber which may or may not contain surface area packing elements and distributing throughout the chamber a liquid chemical which reacts with the exhaust products to form solids or liquids or both which settle to the bottom of the chamber. The reacting chemical is stored as a liquid under pressure in a supply tank, or reservoir, which is connected to the exhaust reaction chamber by a feed and a return pipe. The reacting chemical is fed to the chamber through the feed pipe and the return pipe brings the reaction solids and liquids back to the supply tank where these waste products collect at the bottom. When the supply tank has been emptied of the reacting chemical and all waste products transferred to the supply tank, the feed and return lines are disconnected from the supply tank and the waste products in the supply tank are dumped. The supply tank is then refilled with the reacting chemical and repressurized so that another lasing cycle can be initiated.

BRIEF DESCRIPTION OF THE DRAWING

The single FIGURE is a schematic illustration of an embodiment of the invention.

The same elements or parts throughout the figure of the drawing are designated by the same reference characters

DETAILED DESCRIPTION OF THE PREFERRED EMBODIMENTS

The exhaust products of a laser, e.g., gases such as $N_2$, $NF_3$, $H_2$, HF, $D_2$ and DF exhausted by a chemical laser such as a HF or DF laser, are discharged through a diffuser 10 into a reaction chamber 12, the bottom portion of which is called the collection sump region 14 for reasons which will be apparent hereinafter.

A tank 16, called the supply tank or, more formally, the lithium supply tank and waste reservoir, is placed near the reaction chamber 12. The tank 16 is connected to the chamber 12 by means of a feed line, or pipe, 18 and a return line, or pipe, 20. The feed line 18 comprises a vertical standpipe section 22 inside the supply tank 16, the top of the standpipe 22 being connected to a filter screen element, or simply a filter, 24. The other end of the feed line is connected to a first valve 26, a coupling 28 and a second valve 30, after which it is coupled to an injector 32 which is located at the top of the reaction chamber 12.

One end of the return line 20 is located at the bottom of the chamber 12 in the sump area 14. The other end is connected to the spply tank 16 through a first valve 34, a coupling 36 and a second valve 38.

The supply tank 16 is initially filled with a chemical which will react with the exhaust gases of the laser (not shown) to form solid particles and/or liquid as reaction products. The tank 16 can be filled with solid Li for a HF or DF laser and certain other types of chemical lasers. The solid Li is melted into a liquid by a heater means 44 which is shown schematically. The heater means 44 may actually comprise a plurality of spaced heater elements located inside or outside the supply tank 16, as desired. The liquid Li is pressurized from a pressure source 40 such as a tank or pressurized Ar or other suitable, non-reactive noble gas. The laser is actuated, valves 26 and 30 are opened, and valves 34 and 38 are closed. Lithium liquid is pumped through the filter 24 into the injector 32 and then conveyed into the reaction chamber 12 by the injector 32 where it reacts with the exhaust gases to form waste solids and/or liquids. The wast products settle into the sump area 14. Once the laser is de-energized, valves 26 and 30 are closed while valves 34 and 38 are opened, and a vacuum pump 42 is turned on. The vacuum created thereby in the supply tank 16 sucks the waste products from the collection sump area 14 into the supply tank 16 where they settle to the bottom. When the waste products have been transferred to the supply tank 16, and the lithium supply exhausted, all valves are closed and the couplings 28 and 36 are disconnected. The supply tank 16 may now be removed and emptied through a load/unload port (not shown). The tank 16 may then be reset in place and the lines 18 and 20 are recoupled. The tank may be recharged through the load/unload port when connected or disconnected from the system. Once recharged, the system is ready for reuse.

Instead of, or addition to placing a vacuum in the supply tank 16, the reaction chamber 12 can be pressurized by another pressure source 46 to transfer the waste products in the sump area 14 into the supply tank 16.

There has been described herein an off-line, recirculating, waste management system for a chemical laser which substantially reduces complexity of previous waste management system concepts, improves reload logistics and reduces system weight and volume.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A waste management system for removing the exhaust products of a chemical laser, comprising:
    a reaction chamber coupled to receive the exhaust products of a chemical laser, said chamber having a collection sump region at its bottom;
    a supply tank adapted to be loaded with a chemical which is reactive with said exhaust products to produce one or more solid and/or liquid waste products;
    injection means located at the top of said reaction chamber for delivering and distributing an input liquid into the chamber;
    valved feed line means coupling said supply tank to said injection means, said feed line means being constructed with a coupling which can be disjoined when desired;
    return line means coupling said collection sump area to said supply tank, said return lines means being constructed to be disjoined when desired;
    means for pressurizing said chemical in said supply tank whereby, when said valved feed lines are opened, the chemical is fed to the injection means and delivered to the reaction chamber to react with the exhaust products therein to form waste products which collect in said sump region; and
    transfer means for transferring, after the supply tank chemcial is used up and said pressurizing means is shut off, said waste products from said sump area to said supply tank.

2. A system as in claim 1, wherein:
    said chemical is lithium, and the exhaust products comprise exhaust gases from a DF or HF laser or certain other types of chemical lasers.

3. A system as in claim 2, wherein:
    said system further includes heater means for heating the lithium in said supply tank and converting it into a liquid.

4. A system as in claim 3, further including:
    filter means located in said supply tank and coupled to said feed line, the chemical in said tank entering the feed line through said filter means.

5. A system as in claim 4, wherein:
    said transfer means comprises a vacumm pump connected to said supply tank.

6. A system as in claim 4, wherein:
    said transfer means comprises a pressure source connected to said reaction chamber.

7. A system as in claim 1, wherein:
    said transfer means comprises a vacuum pump connected to said supply tank.

8. A system as in claim 1, wherein:
    said transfer means comprises a pressure source connected to said reaction chamber.

9. A system as in claim 1, further including:
    filter means located in said supply tank and coupled to said feed line, the chemical in said tank entering the feed line through said filter means.

* * * * *